United States Patent [19]
Henley

[11] Patent Number: 6,045,106
[45] Date of Patent: Apr. 4, 2000

[54] CONVERTIBLE TRIVET UTENSIL

[76] Inventor: William V. Henley, P.O. Box 878402, Wasilla, Ak. 99687

[21] Appl. No.: 09/184,045

[22] Filed: Nov. 2, 1998

Related U.S. Application Data

[60] Provisional application No. 60/067,048, Dec. 4, 1997.

[51] Int. Cl.[7] .............................. A47B 91/00; B65D 6/12
[52] U.S. Cl. ................................. 248/346.3; 248/346.05; 248/346.07; 220/8
[58] Field of Search ........................ 248/346.02, 346.03, 248/346.05, 346.06, 346.07, 346.3, 149, 152, 161, 157; 220/8, 666; D7/388, 543

[56] References Cited

U.S. PATENT DOCUMENTS

| D. 210,477 | 3/1968 | Beyer ........................................ D7/389 |
| D. 323,959 | 2/1992 | Ciampi et al. ............................. D7/699 |
| D. 373,709 | 9/1996 | Leu ........................................... D7/567 |
| 1,097,690 | 5/1914 | Ward .......................................... 220/8 |
| 1,224,519 | 5/1917 | Brenner et al. .............................. 220/8 |
| 1,510,631 | 10/1924 | Nutry ....................................... 141/338 |
| 1,607,095 | 11/1926 | Miller .......................................... 220/8 |
| 1,740,418 | 12/1929 | Donnelly .................................. 141/337 |
| 3,967,803 | 7/1976 | Kienlen et al. ........................... 248/152 |
| 4,286,634 | 9/1981 | Wisner ...................................... 141/95 |
| 5,158,123 | 10/1992 | Senko ....................................... 141/338 |
| 5,195,706 | 3/1993 | Allen ........................................ 248/152 |

FOREIGN PATENT DOCUMENTS

| 13786 | 6/1904 | United Kingdom . |
| 473867 | 11/1937 | United Kingdom . |

Primary Examiner—Derek J. Berger
Assistant Examiner—David Heisey
Attorney, Agent, or Firm—Richard C. Litman

[57] ABSTRACT

A convertible trivet utensil having a body defining a central aperture and a planar surface and a plurality of frusto-conical rings oriented concentrically about a central axis and perpendicular to the planar surface so as to function as a trivet. The rings are nested in a single plane within the aperture in a first state and co-planar with the planar surface. A stand is displacibly attached to one of the rings to form a braced paraboloidal cavity as a bowl or container in a second state.

3 Claims, 3 Drawing Sheets

CONVERTIBLE TRIVET UTENSIL

CROSS-REFERENCE TO RELATED APPLICATION

This application claims the benefit of U.S. Provisional Patent Application Ser. No. 60/067,048, filed Dec. 4, 1997.

BACKGROUND OF THE INVENTION

1. Field of the Invention

The present invention relates generally to trivet utensils, and more particularly to a convertible trivet utensils which converts from a planar trivet to a bowl.

2. Description of the Related Art

Various conventional trivet utensils have been devised for holding containers or as a cooling platform. The problem which has long existed is the lack of a dual purpose trivet utensil which provides both the function as a cooling platform and as a container according to the invention herein described.

U.S. Pat. No. 3,967,803, issued to Kienlen et al., discloses a collapsible plastic trivet device which comprises a pair of integrally molded, pivotally connected, elongated plastic arms which operatively open and close in scissor fashion, with upstanding spacer blades. The arms open so that a container can be made to rest on the respective arms. U.S. Pat. No. 5,195,706, issued to Allen, comprises a base with a cylindrical structure mounted thereon for holding a container in an upright position. Other related art shows trivets having various ornamental design features for improving the aesthetic value of the trivet. These include Design Patents issued to Beyer (210, 477), Greger (255, 208), Sabin (259, 762) and Ciampi et al. (323, 959). However, none of these references teach the design features of the invention as herein described.

The convertible trivet utensil of the instant invention is different in that it is a dual purpose trivet utensil, wherein a portion of the utensil is expandable via a plurality of frusto-conically shaped rings to form a bowl shaped or substantially paraboloidal structure, which is neither taught, nor suggested by the prior or related art. Thus, none of the above inventions and patents, taken either singly or in combination, is seen to describe the instant invention as claimed.

SUMMARY OF THE INVENTION

The present invention comprises a dual purpose trivet utensil for holding containers as a planar cooling platform or for holding other items such as fruit, bread, etc. in a converted bowl configuration. The trivet is a convertible trivet utensil having a body with a central aperture and a plurality of frusto-conical rings co-planarly arranged therein, the rings being displacibly attached to a stand.

The stand comprises a base having a first and second brace pivotally attached to a first and second respective portion of the base. The braces are respectively rotatably fixed at angles proximate 0 and 180 degrees in a first state, and at angles proximate 90 and 270 degrees in a second state. In the second state, the trivet is converted to a bowl shaped or paraboloidal utensil with braces supporting the body in a vertically raised, position.

The body of the trivet can be defined by various design configurations (i.e. animal faces, the Pan handle State of Florida and other respective geographical shapes of states in the USA, etc.). For example, the trivet as a cooling platform could hold lobster for serving, with the body designed to resemble a lobster, and subsequently converted to a bowl configuration for efficient shell removal. In this regard, the trivet utensil can be appropriately designed for any occasion as further herein described.

Accordingly, it is a principal object of the invention to provide a convertible trivet utensil which converts from a first state as a trivet to a second state as a bowl.

It is another object of the invention to provide a convertible trivet utensil which permits alteration from a first state by simple rotation of bracing elements.

It is a further object of the invention to provide a convertible trivet utensil which may be simulative of various decorative designs.

Still another object of the invention is to provide improved elements and arrangements thereof in the utensil for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
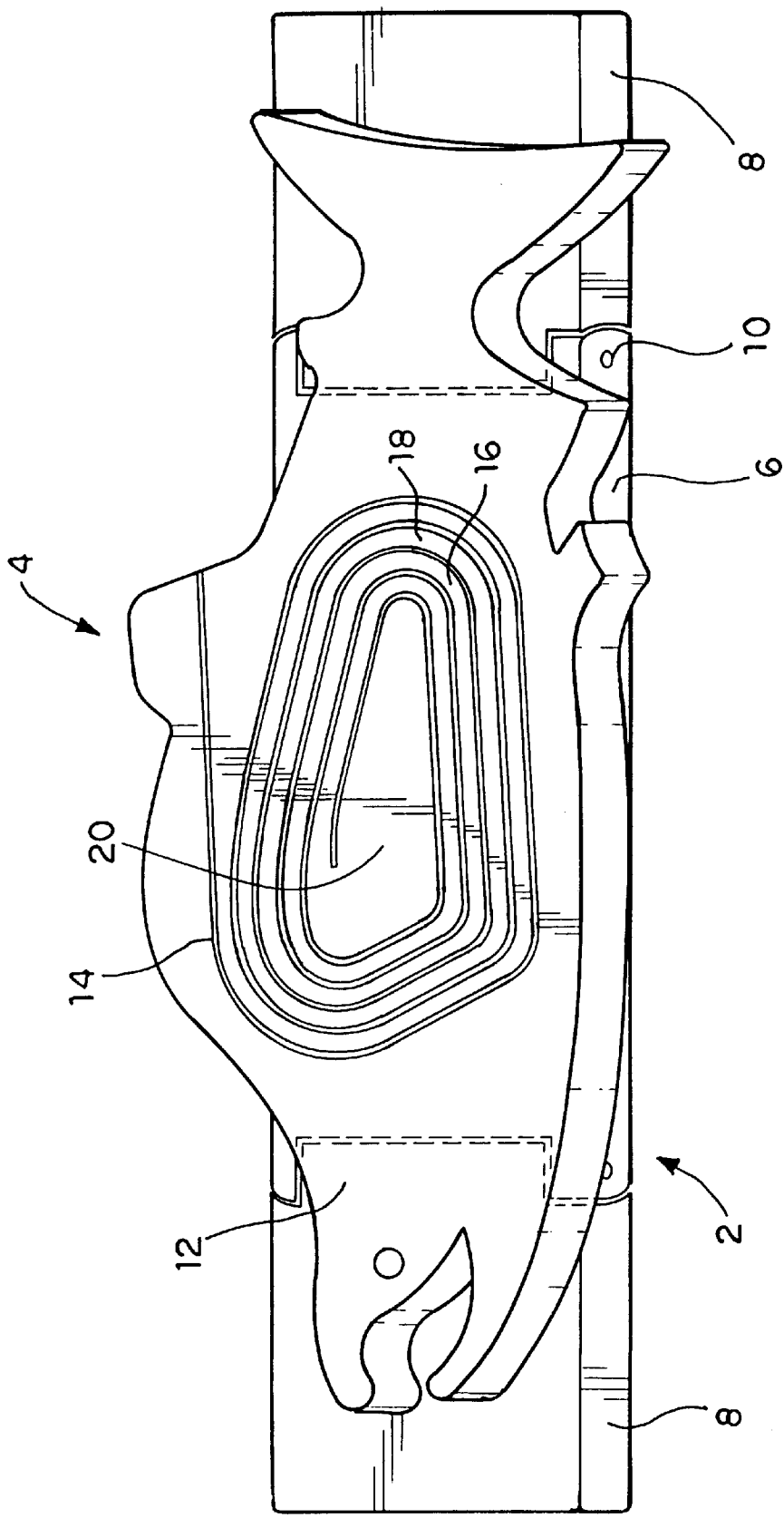
FIG. 1 is a perspective view of a first embodiment of the convertible trivet utensil with a Alaskan Salmon face in a first state for use as a trivet.
Figure 2:
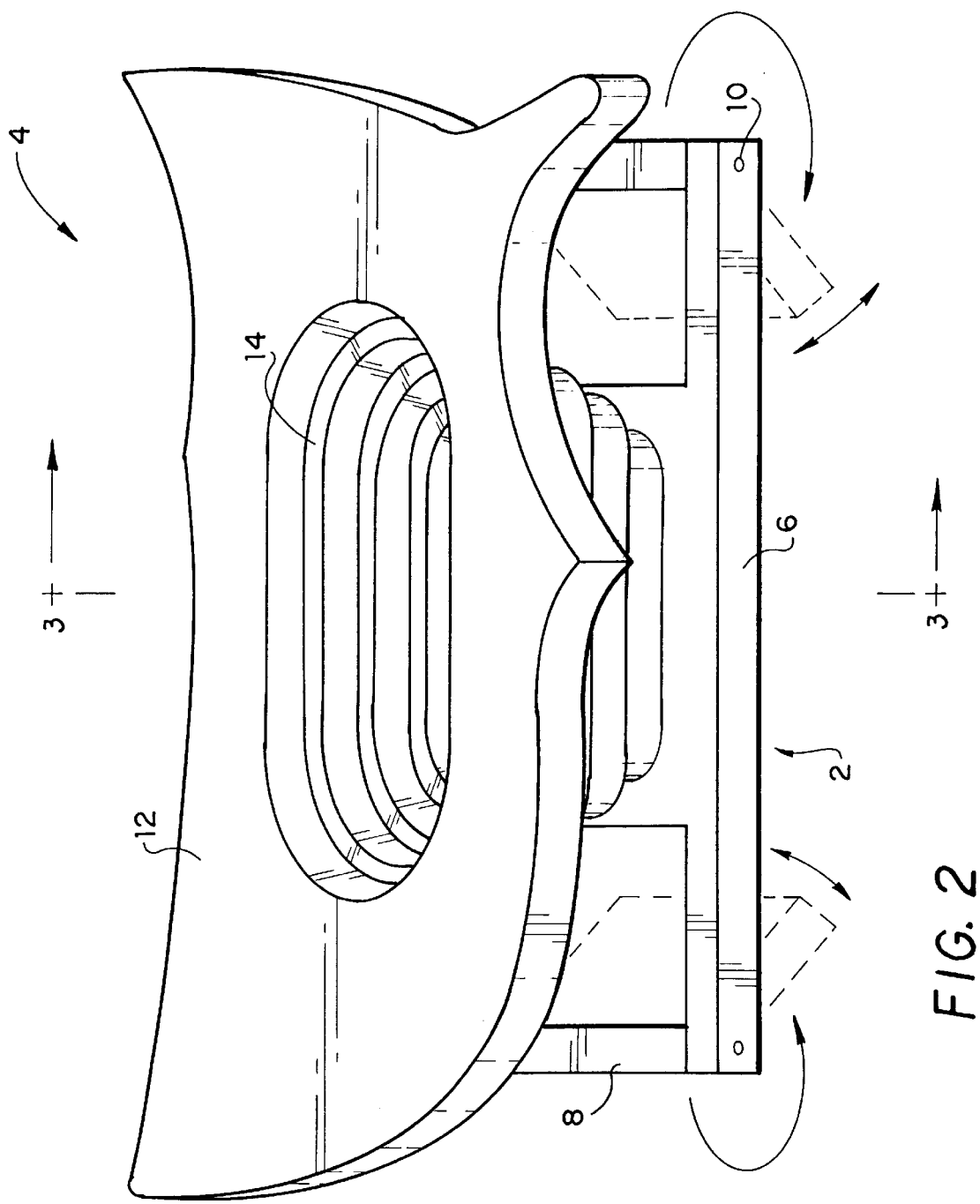
FIG. 2 is an environmental view of a second embodiment the convertible trivet utensil in a second state according to the invention forming a substantially paraboloidal cavity for use as a bowl.
Figure 3:
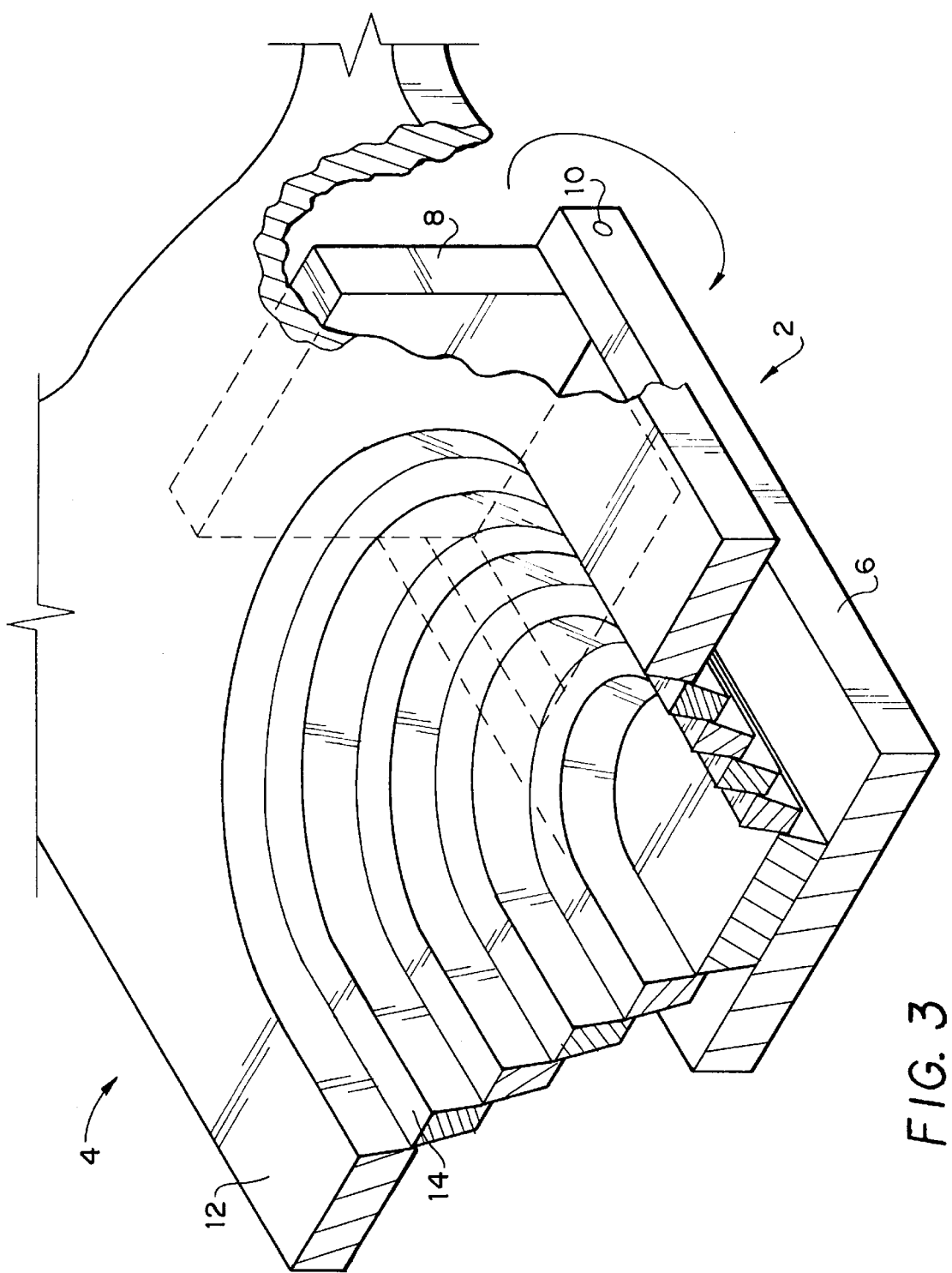
FIG. 3 is a sectional view of the present convertible trivet utensil in the second state schematically illustrating the nested frusto-conical rings according to the invention.

The present invention is directed to a convertible trivet utensil. A preferred embodiment of the present invention is depicted in FIGS. 1–3 and is generally referenced by numeral 4. As best seen in FIG. 1, the convertible utensil includes a body 12, and stand 2, comprising a base 6, and a first and second brace member 8, the material of which is selected from a non-conductive material such as wood.

The construction or design of the base 6 is not limited to that shown in the drawings, but could be of any number of designs (i.e. T-shaped, oblong, etc.) as required by the skilled artisan to maintain structural stability. The brace members 8 are symmetrically disposed with respect to one another along the base 6, and are connected thereto at first and second respective pivot means 10 to form an integral structure with the stand 2. Various pivoting means can be used as well known by one of ordinary skill in the art (not shown).

In FIG. 1, a body 12 defines a central aperture containing an innermost planar member 20 surrounded by a plurality of nested frusto-conical rings 14 cut therein as a single spiraled cut at pitched angles between 2 ½ to 3 ½ degrees. The frusto-conical rings are nested such that an interior ring 16 has a smaller diameter than a neighboring or outer ring 18.

The angle of the cut is significant in that, it allows these rings to separate from one another at the interface between the outer wall of an interior ring and the inner wall of a neighboring ring, thereby forming a subsequent bowl shaped or paraboloidal structure as shown in FIG. 3. As seen in the figure, a cross-sectional view of the invention illustrates how a body 12 is and displacibly attached to the top surface of the base 6 via innermost planar members 20. By virtue of the angled cuts, each inner wall of a ring when successively raised will pass upward and eventually bind with the outer wall of the next ring. An alternate arrangement of the frusto-conical rings can be formed by a plurality of nested concentric rings wherein the rings are attached to the base and body using fastening methods well known by one skilled in the relevant art.

The nested rings are arranged co-planar within the aperture and concentric with respect to a perpendicular axis to the aperture. As shown in FIG. 2, the frusto-conical shaped rings reach maximum vertical displacement when the braces 8 are rotated in such a way to form a wedge between the base 6 and the body 12 at an angle perpendicular with respect to the base and the body.

As diagrammatically illustrated in FIG. 2, the body or face 12 can be constructed to resemble the geographical depiction of the USA or alternatively of individual states therein. In addition, the body or face can be made to resemble other animals such as salmon, bears or other configurations as desired.

The convertible trivet utensil can be compactly packed and stored, and can be readily expanded to a functional position as best illustrated in FIGS. 1 and 2. FIG. 1 shows the convertible trivet utensil configured in planar form for simple use as a. cooling platform or preparation for storage.

Other advantages of the instant invention include the versatility of numerous decorative and finishes which can be applied by techniques used by the skilled artisan, in order to improve the aesthetic value of the invention. In one instance, the structural material of the trivet lends itself to various stains used to reflect various wood textures seen in oak, cherry and other woods. Also, the material can include personalized inscriptions such as names, phrases or pictorial designs. In another instance, special linings can be placed within the bowl prior to use as a bread, fruit, or otherwise basket or container.

While illustrative examples of the invention have been principally depicted as wooden structures by way of example, the convertible trivet utensil according to the instant invention can include metallic material structures as well, so long as the Brinell hardness (BHN) of the cutting metal source is significantly hard for cutting the metal material or specimen. It is to be understood that the present invention is not limited to the sole embodiment described above, but encompasses any and all embodiments within the scope of the following claims.

What is claimed is:

1. A convertible trivet utensil comprising:

a body defining a central aperture containing an innermost planar member surrounded by a plurality of concentrically oriented frusto-conical rings;

said plurality of frusto-conical rings being nested in a first state in a single plane within said aperture and having a flat surface co-planar with said innermost planar member, wherein said plurality of frusto-conical rinds are formed by a spiraled angled cut in said body; and a stand having a planar base secured to said innermost planar member, said stand including first and second planar brace members pivotally attached at respective opposite ends of said base, wherein said brace members are co-planar with said base in said first state and are rotated upwardly to support said body in a second state, whereby said plurality of frusto-conical rings form a substantially paraboloidal cavity in said second state.

2. The convertible trivet utensil of claim 1, wherein said utensil is made of wood.

3. The convertible trivet utensil of claim 1, wherein said utensil is made of a metallic material.

* * * * *